(12) United States Patent
Yoshikawa et al.

(10) Patent No.: US 8,373,327 B2
(45) Date of Patent: Feb. 12, 2013

(54) ATTACHMENT STRUCTURE FOR MOTOR ASSEMBLY

(75) Inventors: Syuji Yoshikawa, Anjo (JP); Atsushi Sakai, Anjo (JP)

(73) Assignee: Makita Corporation, Anjo-shi (JP)

( * ) Notice: Subject to any disclaimer, the term of this patent is extended or adjusted under 35 U.S.C. 154(b) by 343 days.

(21) Appl. No.: 12/792,180

(22) Filed: Jun. 2, 2010

(65) Prior Publication Data

US 2010/0327685 A1    Dec. 30, 2010

(30) Foreign Application Priority Data

Jun. 29, 2009    (JP) .................................. 2009-154175

(51) Int. Cl.
*H02K 13/00*    (2006.01)
(52) U.S. Cl. .......................................... 310/239; 310/89
(58) Field of Classification Search .................. 310/239, 310/154.01, 154.12, 89
See application file for complete search history.

(56) References Cited

U.S. PATENT DOCUMENTS

| | | | |
|---|---|---|---|
| 4,546,280 A | * | 10/1985 | Pfluger ........................ 310/68 D |
| 4,593,221 A | * | 6/1986 | Harris et al. .................. 310/242 |
| 6,713,916 B1 | | 3/2004 | Williams et al. |
| 7,063,170 B2 | * | 6/2006 | Ortt et al. ........................ 173/29 |
| 2004/0171299 A1 | | 9/2004 | Zeiler et al. |
| 2007/0188027 A1 | | 8/2007 | Sakamaki et al. |

FOREIGN PATENT DOCUMENTS

| | | |
|---|---|---|
| DE | 297 02 947 U1 | 7/1998 |
| DE | 10 2007 001 388 A1 | 7/2007 |
| DE | 10 2006 000 543 A1 | 6/2008 |
| EP | 1 598 151 A2 | 11/2005 |
| JP | A-2007-143314 | 6/2007 |

OTHER PUBLICATIONS

European Search Report issued in European Patent Application No. 10166823.4 on Oct. 18, 2010.

* cited by examiner

*Primary Examiner* — Dang Le
(74) *Attorney, Agent, or Firm* — Oliff & Berridge, PLC (57) ABSTRACT

In attachment structure for motor assembly, accommodating portion with a bottom is formed in housing such that the motor assembly including commutator motor and brush holder unit is accommodated therein with the brush holder unit facing downward. Receiving portion for positioning the brush holder unit is formed in the accommodating portion. Abutment portion is formed on the brush holder unit for positioning between stator and the brush holder unit. The motor assembly is positioned within the accommodating portion such that the brush holder unit is in contact with the receiving portion and that the stator and the brush holder unit are brought into contact with each other through the abutment portion. Fixing member is inserted from an open side of the housing, brought into contact with the stator, and fixed to the housing, so that the motor assembly is interposed between the fixing member and the receiving portion.

15 Claims, 13 Drawing Sheets

RELATED ART

FIG.10

RELATED ART

FIG.11

RELATED ART

RELATED ART

ATTACHMENT STRUCTURE FOR MOTOR ASSEMBLY

BACKGROUND OF THE INVENTION

This application claims the entire benefit of Japanese Patent Application Number 2009-154175 filed on Jun. 29, 2009, the entirety of which is incorporated by reference.

1. Field of the Invention

The present invention relates to a structure for attaching a motor assembly comprising a commutator motor and a brush holder unit to a tubular housing such as used for a power tool.

2. Description of Related Art

As disclosed in Japanese Laid-open Patent Publication No. 2007-143314, a power tool such as an electric hammer has a tubular housing, and a stator of a commutator motor (e.g., universal motor) is accommodated in the housing, while a rotor of the commutator motor is rotatably supported by a bearing provided in the housing. Attached to the housing adjacent to the commutator motor is a brush holder unit which holds brushes being slidable in contact with a commutator provided on the rotor.

Figure 9:
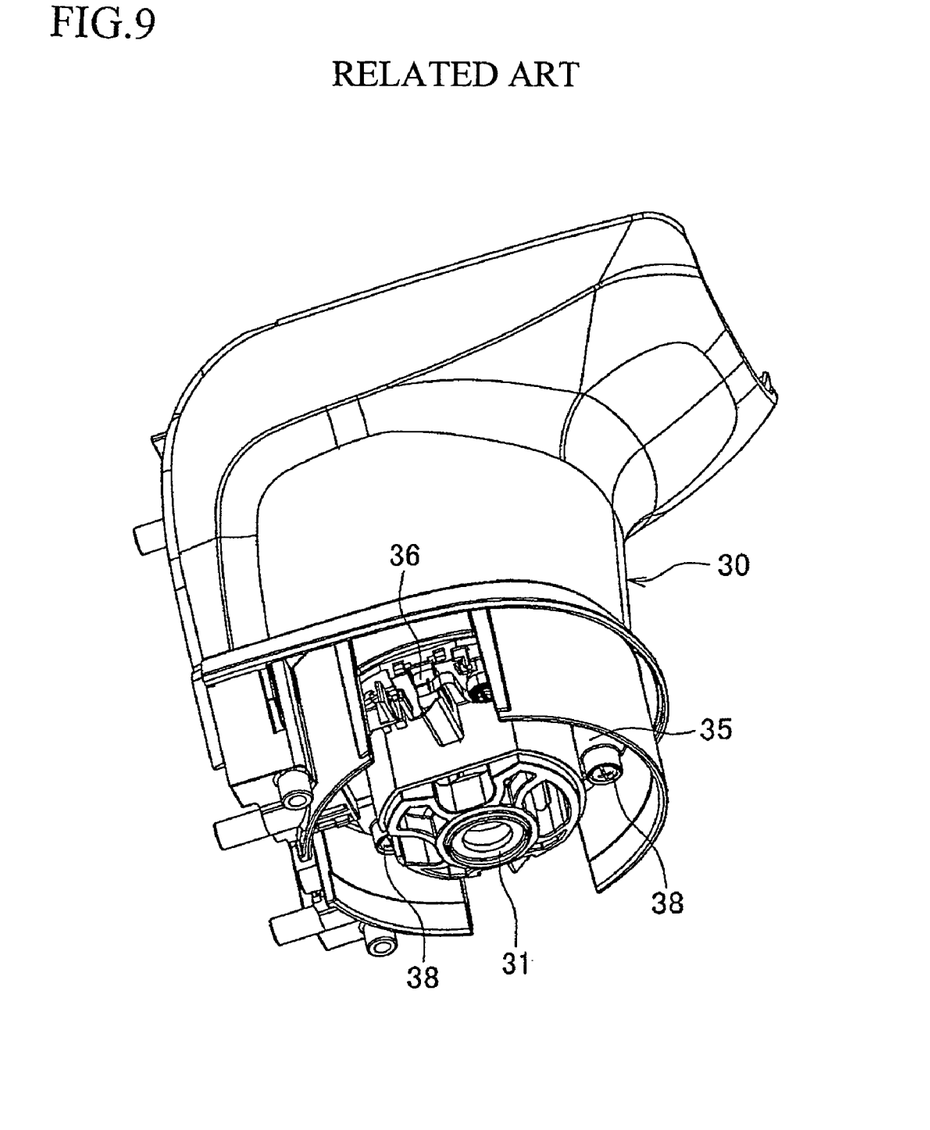
FIG. 9 is a perspective view of a conventional motor housing.
Figure 10:
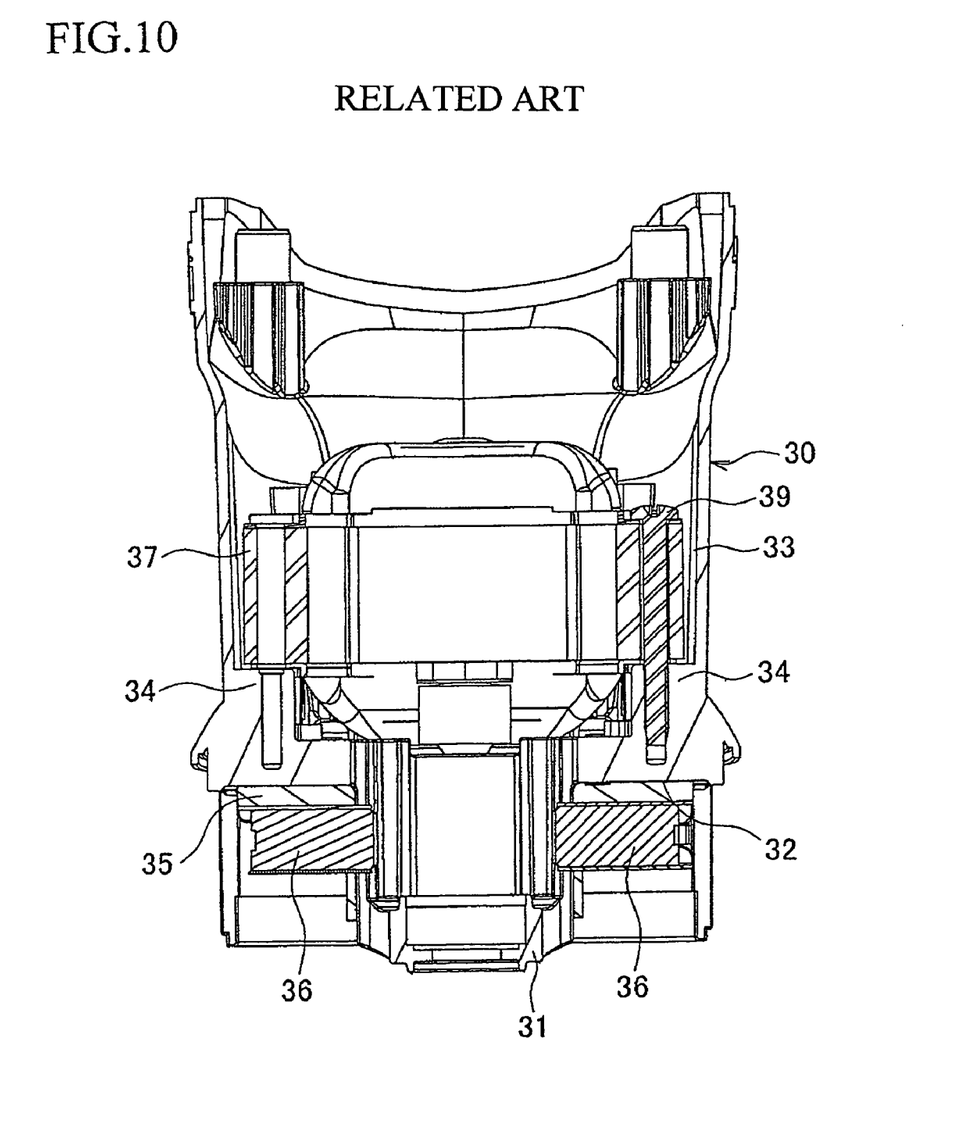
FIG. 10 is a vertical section of the conventional motor housing taken in a right and left direction.
Figure 11:
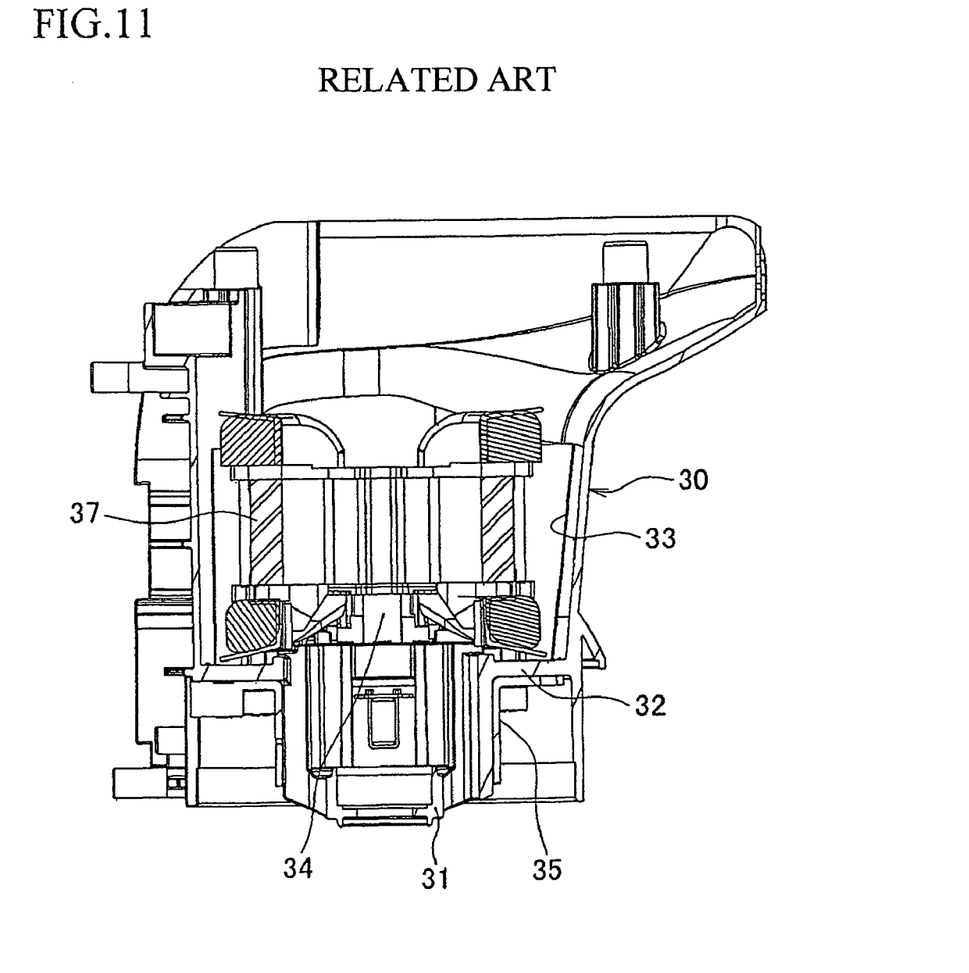
FIG. 11 is a vertical section of the conventional motor housing taken in a front and rear direction.

FIG. 9 is a perspective view of a motor housing 30 to which a motor assembly is attached, FIG. 10 is a vertical section taken in a right and left direction, and FIG. 11 is a vertical section taken in a front and rear direction. As seen in the drawings, a bearing 31 for rotatably supporting a rotor (not shown) of a commutator motor is protrusively provided at a lower end of a tubular motor housing 30. The motor housing 30 is open at an upper end thereof. The motor housing 30 has an attachment seat 32 peripherally around the bearing 31, and a disk-shaped brush holder unit 35 for holding a pair of brushes 36, 36 each being slidable in contact with a commutator segment of a commutator provided on the rotor is mounted to the attachment seat 32 and fixed by screwing bolts from beneath the brush holder unit 35. In the meantime, an accommodating portion 33 for the commutator motor is formed in the motor housing 30, and bosses 34, 34 are provided at the bottom of the accommodating portion 33, against which an end surface of a stator 37 is in contact and fixed by screws.

Figure 12:
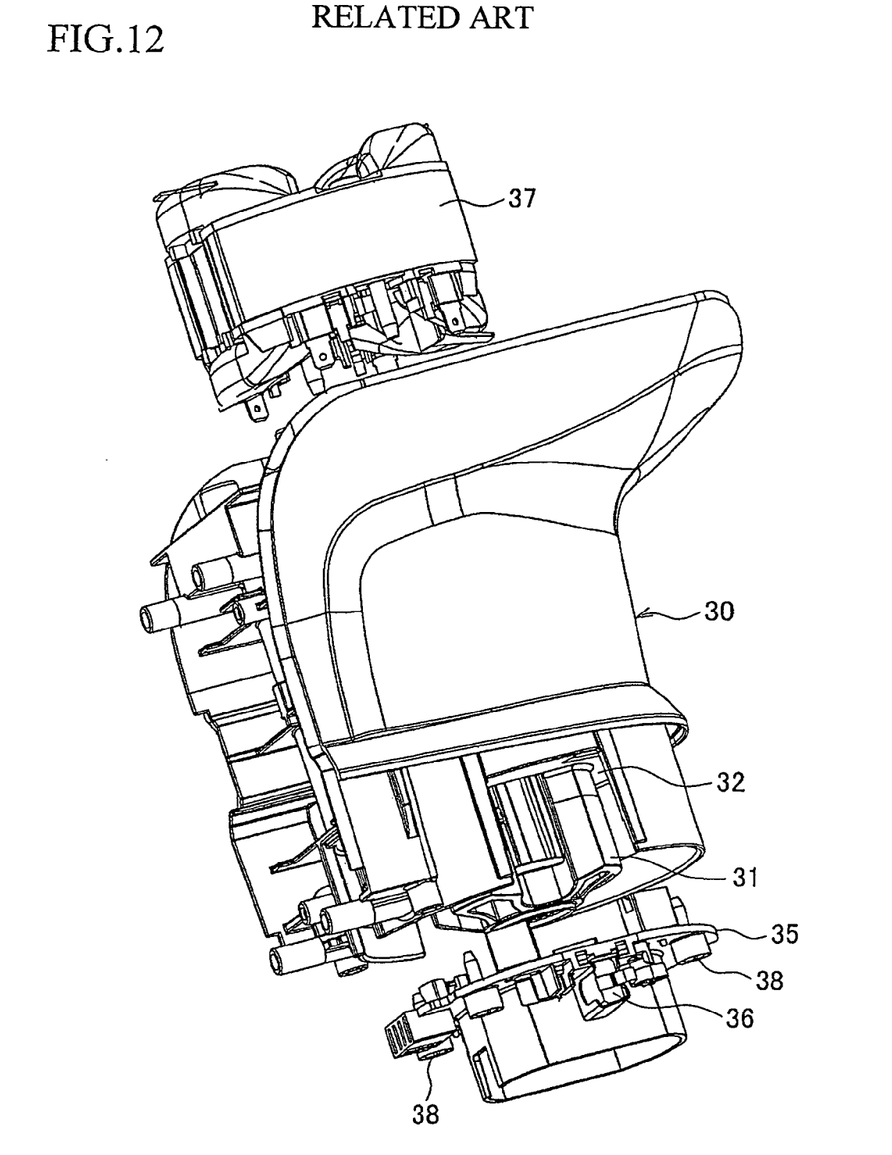
FIG. 12 is an exploded perspective view of a conventional attachment structure for a motor assembly.
Figure 13:
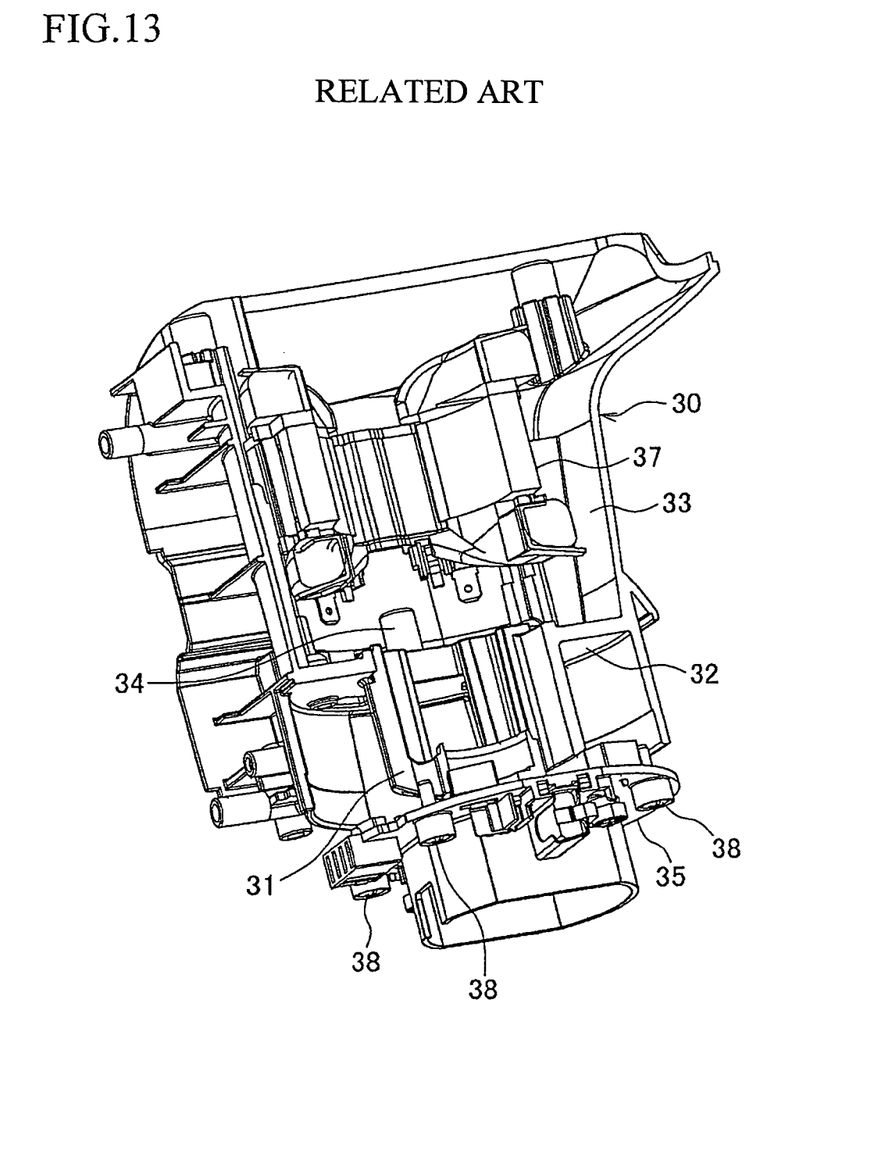
FIG. 13 is a perspective view illustrating an assembled state of the conventional motor assembly.

Therefore, when the brush holder unit 35 and the stator 37 are attached to the motor housing 30, as seen in FIGS. 12 and 13, the brush holder unit 35 is fixed to the attachment seat 32 by screws 38, 38 from beneath the motor housing 30. On the contrary, the stator 37 is inserted into the accommodating portion 33 from above the motor housing 30 and fixed to the bosses 34, 34 by screws 39, 39.

As described above, the brush holder unit 35 and the stator 37 are mounted from the opposite sides and fixed to the motor housing 30 by screws. This disadvantageously leads to deterioration of workability during assembly, an increased diameter of the stator 37 because of proving screw-threaded portions, and possible limitations on the construction of the brush holder unit 35.

Further, since the bearing 31 of the rotor is protrusively provided in the motor housing 30 at the middle of the attachment seat 32 of the brush holder unit 35, a sufficient bearing rigidity is not obtained so that the operating life of the brushes 36, 36 may be decreased due to vibration of the rotor.

It is thus an object of the present invention to provide an attachment structure for a motor assembly, by which a motor assembly comprising a commutator motor and a brush holder unit can be assembled with better workability, and by which an enhanced bearing rigidity can be obtained to ensure a sufficient operating life of the brushes, while avoiding increased diameter of the stator and possible limitations on the construction of the brush holder unit.

SUMMARY OF THE INVENTION

In accordance with the present invention as embodied and described herein as a first embodiment, an attachment structure for a motor assembly comprises: a tubular housing; a motor assembly including a commutator motor and a brush holder unit configured to hold brushes being slidable in contact with a commutator of the commutator motor; an accommodating portion with a bottom, formed in the housing and configured to accommodate therein the motor assembly with the brush holder unit facing downward; a receiving portion formed in the accommodating portion and configured to position the brush holder unit when it comes into contact with the brush holder unit; an abutment portion at least formed on one of a stator of the commutator motor and the brush holder unit, and configured to come into contact with the corresponding brush holder unit or stator adjacent thereto during assembly so that positioning is made between the stator and the brush holder unit; and a fixing member configured to be inserted from an open side of the housing, brought into contact with the stator, and fixed to the housing, wherein the motor assembly is positioned within the accommodating portion such that the brush holder unit is in contact with the receiving portion and that the stator and the brush holder unit are brought into contact with each other through the abutment portion, and wherein using the fixing member, the motor assembly is interposed and fixed between the fixing member and the receiving portion.

Preferably, in a second embodiment, the attachment structure according to the first embodiment may be characterized in that the fixing member is a screw, which is inserted from the open side of the housing and screwed into the housing through the stator and the brush holder unit.

Preferably, in a third embodiment, the attachment structure according to the second embodiment may be characterized in that the receiving portion and the abutment portion are in phase with each other, and that the screw is inserted through the stator and the brush holder unit at a position of the abutment portion and screwed into the receiving portion.

Preferably, in a fourth embodiment, the attachment structure according to the first embodiment may be characterized in that a baffle plate is mounted to the housing near an opening of the housing, which covers an upstream side of a cooling fan that is provided on a rotor of the commutator motor, and that a second abutment portion is formed at least on one of the stator and the baffle plate, which comes into contact with the corresponding baffle plate or stator during assembly for positioning between the stator and the baffle plate, and the baffle plate functions as the fixing member such that by fixing the baffle plate to the housing, the motor assembly is interposed and fixed between the baffle plate and the receiving portion.

With the aforementioned configuration of the attachment structure according to the first embodiment, it is possible to attach the motor assembly to the housing with better workability. Further, since the motor assembly is interposed and fixed between the fixing member and the receiving portion, it is not necessary to increase the diameter of the stator for the purpose of ensuring the screw-threaded portions and it is not subject to limitations on the construction of the brush holder unit. Furthermore, since it is not necessary to protrusively provide the bearing for the rotor on the housing, an enhanced bearing rigidity can be obtained, which results in less vibration on the rotor as well as in a sufficient operating life of the brushes.

With the aforementioned configuration of the attachment structure according to the second embodiment, in addition to the above advantageous effects of the first embodiment, the motor assembly is fixed by the screw which is inserted through the stator and the brush holder unit and screwed into the housing, so that the motor assembly can be interposed and fixed between the screw and the receiving portion without suffering from backlash in the radial direction or the peripheral direction of the housing.

With the aforementioned configuration of the attachment structure according to the third embodiment, in addition to the above advantageous effects of the second embodiment, the interposed position of the motor assembly by the screw and the abutment position between the component parts are in conformity with each other, so that a more stable assembly can be provided.

Further, with the aforementioned configuration of the attachment structure according to the fourth embodiment, in addition to the above advantageous effects of the first embodiment, it is possible to provide an efficient attachment structure by which the motor assembly can be interposed and fixed between the fixing member and the receiving portion at the same time as assembling the conventional baffle plate.

BRIEF DESCRIPTION OF THE DRAWINGS

The above aspect, other advantages and further features of the present invention will become more apparent by describing in detail illustrative, non-limiting embodiments thereof with reference to the accompanying drawings, in which:

FIGS. 6A and 6B are perspective views of a brush holder unit, in which

DETAILED DESCRIPTION OF THE EXEMPLARY EMBODIMENTS

With reference to the accompanying drawings, exemplary embodiments of the present invention will be described in detail.

In brief, an electric hammer is a well-known power tool which comprises: a motor housing 1; a gear housing attached to an upper part of the motor housing 1 and in which a crank mechanism is disposed; a tubular housing attached to a front side (i.e., right side of FIG. 1) of the gear housing and in which an impact mechanism is disposed; and a bit attached to a front side of the tubular housing and to which an impact force is exerted. A handle housing is attached to a rear surface of the motor housing 1.

Figure 1:
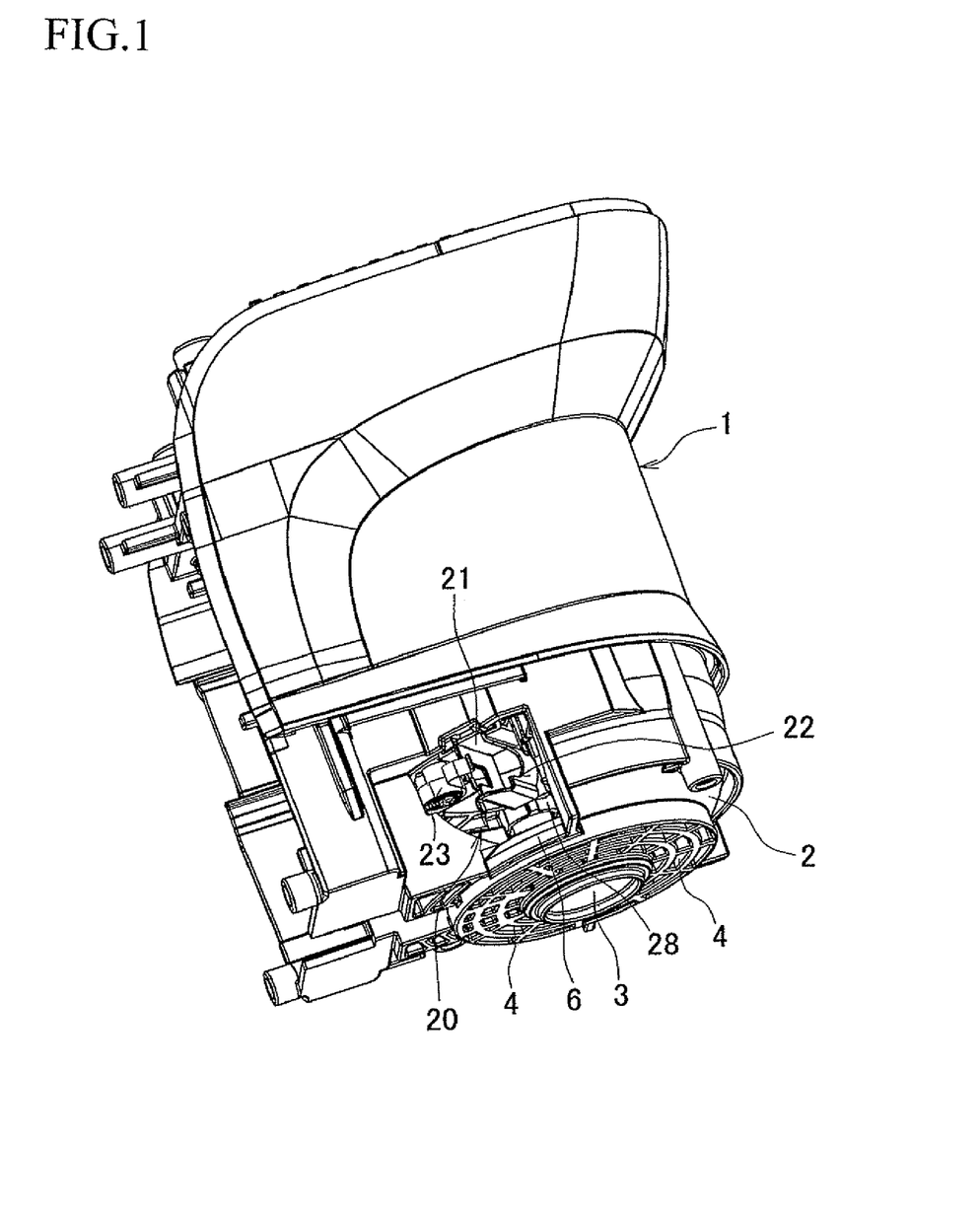
FIG. 1 is a perspective view of a motor housing.

As seen in FIG. 1, the motor housing 1 has a tubular shape of which a lower end is closed and an upper end is open. The lower end of the motor housing 1 provides a closed portion 2, and a supporting portion 3 configured to support a bearing for rotatably supporting a rotor of a commutator motor is depressingly provided at a center of the closed portion 2. A plurality of air suction holes 4, 4 for sucking a cooling air to cool the commutator motor are formed peripherally around the supporting portion 3.

Figure 2:
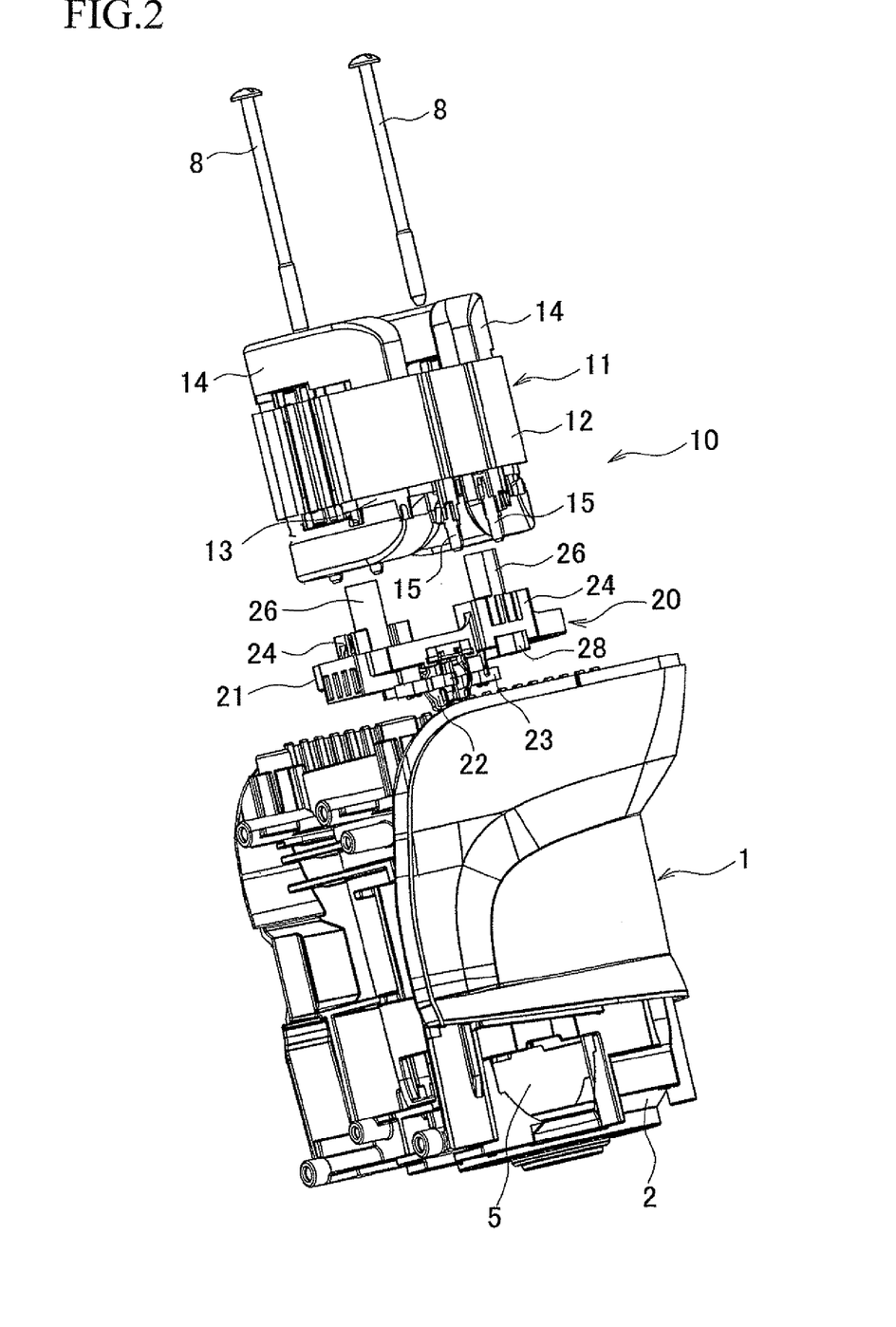
FIG. 2 is an exploded perspective view of an attachment structure for a motor assembly.
Figure 3:
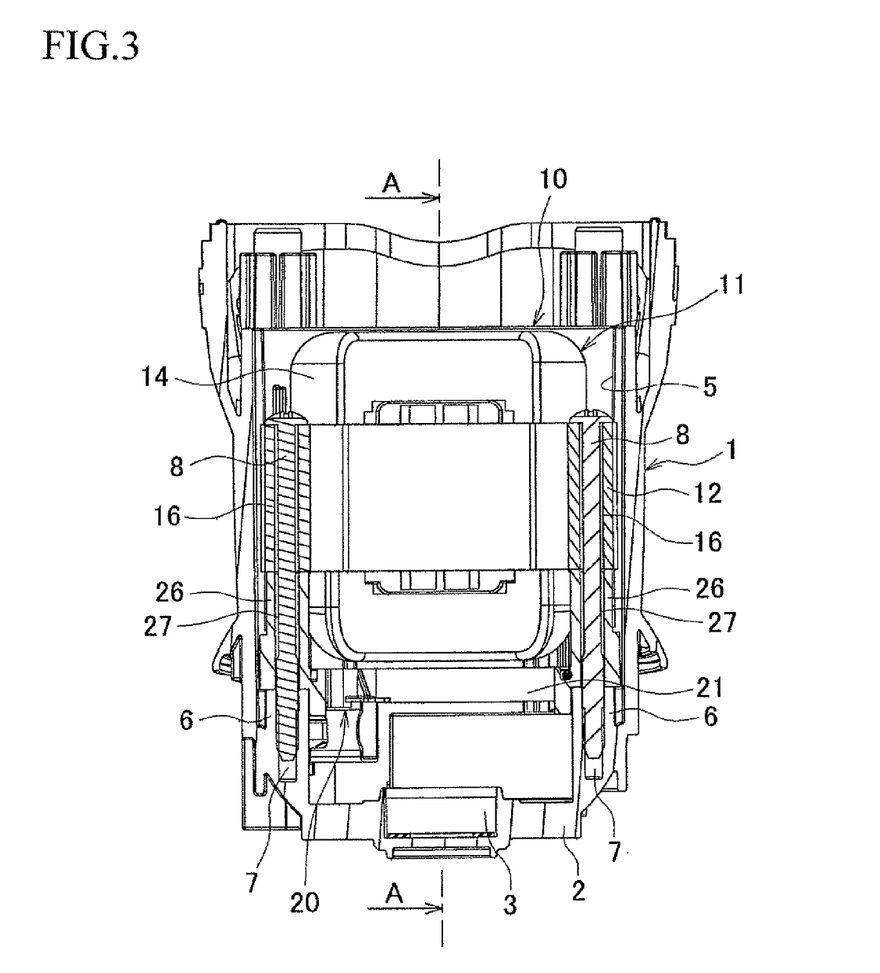
FIG. 3 is a vertical section taken in a right and left direction of the motor housing.
Figure 4:
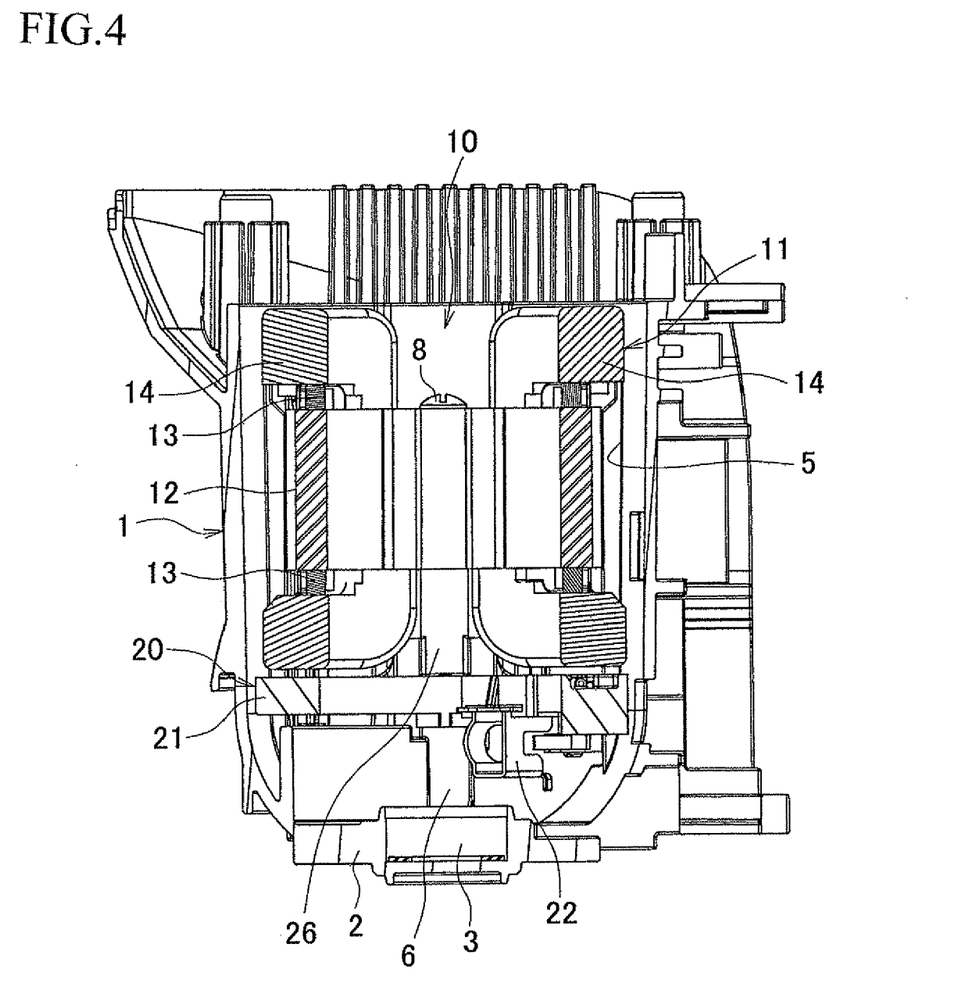
FIG. 4 is a sectional view taken along the line A-A of FIG. 3.

As best seen in FIG. 2, an accommodating portion 5 with a bottom is formed in the motor housing 1. The accommodating portion 5 is configured to accommodate a motor assembly 10 including a commutator motor and a brush holder unit 20 by press fitting the respective parts with the brush holder unit 20 facing downward. As seen in FIGS. 3 and 4, a pair of bosses 6, 6 as receiving portions are provided at a bottom portion of the accommodating portion 5 in a point symmetrical arrangement. Each of the bosses 6, 6 has a screw hole 7 which opens upward.

Figure 5:
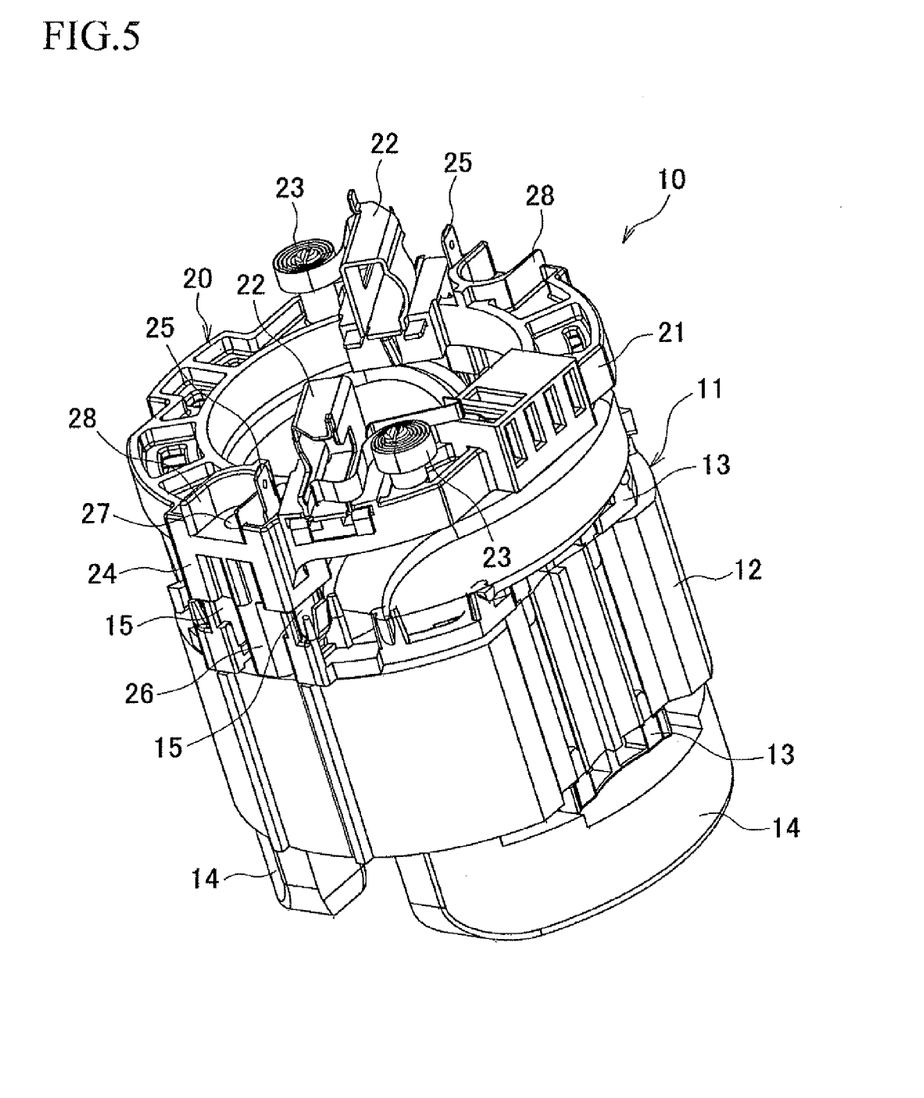
FIG. 5 is a perspective view of the motor assembly.

The commutator motor received in the accommodating portion 5 includes a stator 11 and a rotor (not shown). As seen in FIG. 5, the stator 11 comprises a core 12 extending along its axis, a pair of terminal plates 13, 13 positioned at upper and lower ends of the core 12, a pair of main windings 14, 14 wound around the core 12, and a pair of sets of metal terminals 15, 15 provided in point symmetrical positions and protruding from an upper surface of the upper terminal plate 13 (in FIGS. 5, an upper side of the figure is referred to as an upper side when explaining the motor assembly 10. So is FIG. 6A). Provided between each set of metal terminals 15, 15 is a through hole 16 which axially penetrates through the core 12 and the terminal plate 13 and opens from top to bottom. The through holes 16, 16 are arranged in positions corresponding to the bosses 6, 6 of the accommodating portion 5.

Figure 6A:
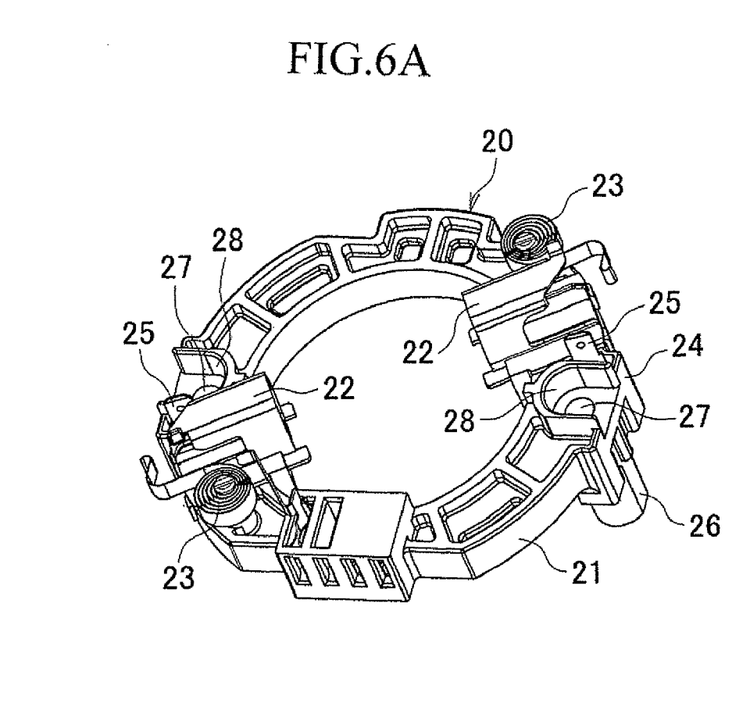
FIG. 6A is a view from above.
Figure 6B:
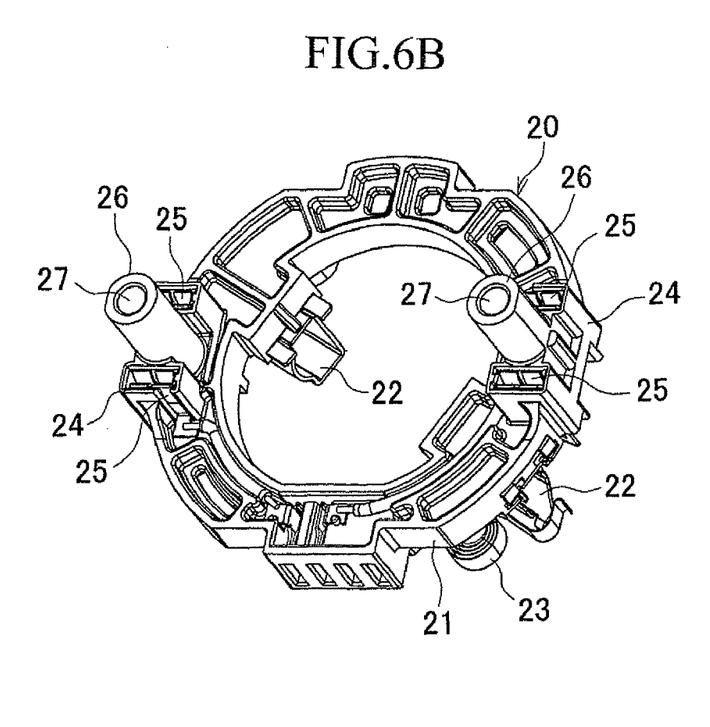
FIG. 6B is a view from below.

As seen in FIGS. 6A and 6B, the brush holder unit 20 has a ring-shaped base 21 which is substantially the same size as the terminal plate 13 of the stator 11. Brush holders 22, 22 in the shape of a rectangular tube are arranged on an upper surface of the base 21 in a point symmetrical arrangement, and brushes (not shown) being slidable in contact with the commutator of the rotor are retained in the brush holders 22, 22. Reference number 23 is a spiral spring which is provided to the lateral of brush holder 22 and at its end portion urges the brush toward a center of the brush holder unit 22 (i.e., toward the commutator), and reference number 24 is a connecting portion having a metal terminal 25 and configured to be electrically connected to the metal terminals 15, 15 of the terminal plate 13 by inserting the metal terminals 15, 15 into the connecting portion 24. A pair of spiral springs 23, 23 and a pair of connecting portions 24, 24 are provided in a point symmetrical arrangement. One portion of the metal terminal 25 protrudes upward toward a switch, and the other portions of the metal terminal 25 extend toward the brush holder 22, so as to create an electrical connection between them.

A cylinder portion 26 as an abutment portion is provided between the metal terminals 25, 25 of each connecting portion 24 at a lower side of the base 21. The cylinder portion 26 protrudes downward, and a through hole 27 penetrates through the base 21 and the cylinder portion 26 and opens from top to bottom. The cylinder portion 26 is brought into contact with the upper surface of the terminal plate 13 of the stator 11 while adjusting phase. Further, a rib 28 having a U-shaped configuration as seen from top is provided on the upper surface of the base 21 at a periphery of each through hole 27. The rib 28 opens radially outward toward the circumference of the base 21. The bosses 6, 6 provided on the motor housing 1 are fitted into the ribs 28, 28 during assembly.

According to the motor assembly 10 as described above, as seen in FIG. 5, the brush holder unit 20 is attached to the upper surface of the stator 11 while adjusting phase between the through holes 16, 16 and the cylinder portions 26, 26. This allows the metal terminals 15, 15 of the terminal plate 13 to be inserted into the corresponding connecting portions 24, 24 and the cylinder portions 26, 26 to be brought into contact with the upper surface of the terminal plate 13 for establishing communications between the through holes 16, 27.

Figure 7:
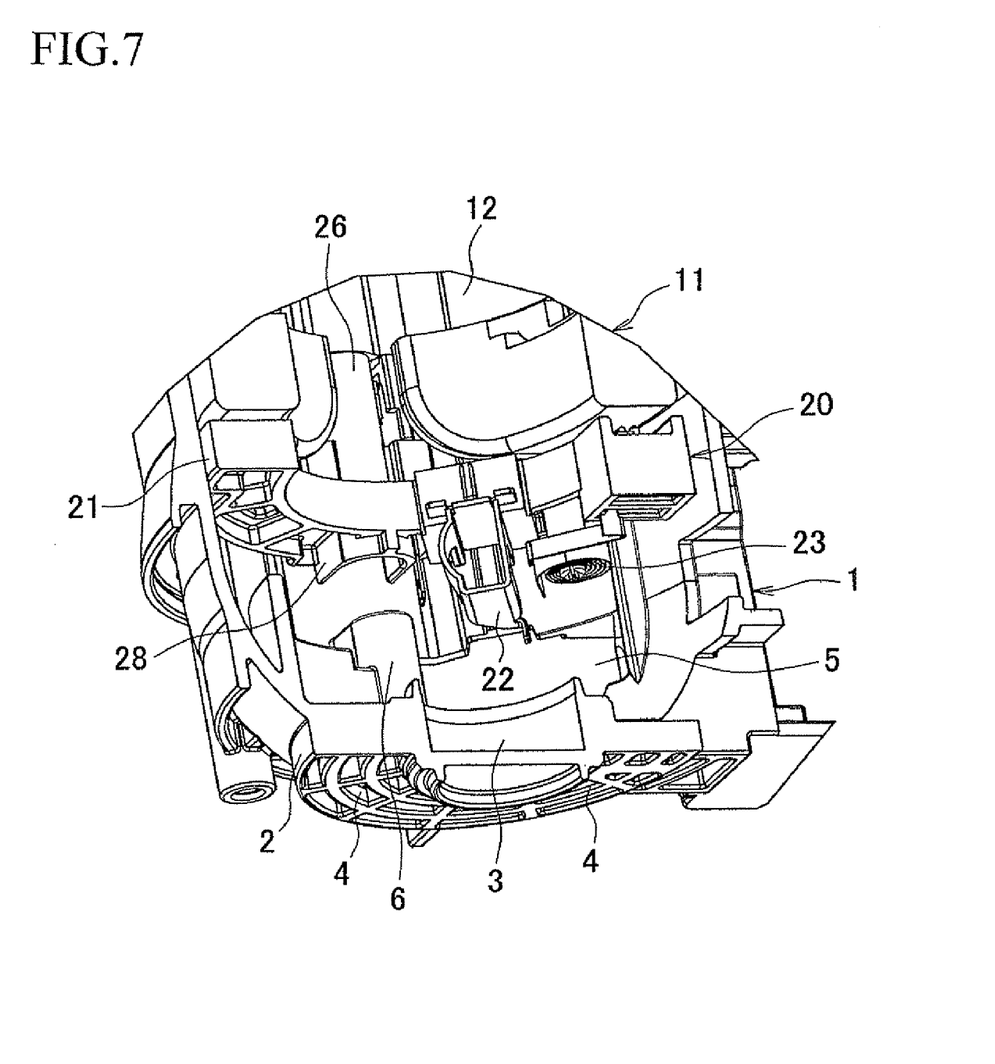
FIG. 7 is an enlarged perspective view illustrating an assembled state of the motor assembly.

As best seen in FIG. 7, while adjusting phase between the through holes 27, 27 and the bosses 6, 6, the thus assembled motor assembly 10 is inserted and press fitted into the accommodating portion 5 of the motor housing 1 from an upper opening of the motor housing 1 with the brush holder unit 20 facing downward. This can establish communications between the through holes 27, 27 and the screw holes 7, 7 by the result that the base 21 comes into engagement with the bosses 6, 6 within the accommodating portion 5 and the bosses 6, 6 are fitted into the ribs 28, 28.

In this state where the motor assembly 10 is received in the accommodating portion 5, two screws 8, 8 are inserted from above the stator 11 into the through holes 16, 16 and screwed into the screw holes 7, 7 of the bosses 6, 6, penetrating through the cylinder portions 26, 26 of the brush holder unit 20 and the through holes 27, 27. Accordingly, the stator 11 and the brush holder unit 20 are fixed, as seen in FIGS. 3 and 4, while being interposed between the bosses 6, 6 and screw heads of the screws 8, 8. Finally, the rotor (not shown) is inserted into the stator 11 from above, and the lower end of the rotor is rotatably supported by the supporting portion 3, so that attachment of the motor assembly 10 is completed.

As described above, the attachment structure for the motor assembly 10 according to this exemplary embodiment is configured such that: the accommodating portion 5 with a bottom is formed in the motor housing 1, in which the motor assembly 10 is received with the brush holder unit 20 facing downward; that the bosses 6, 6 are formed in the accommodating portion 5 so as to contact with the brush holder unit 20 for positioning therebetween; that the cylinder portions 26, 26 are provided on the brush holder unit 20 so as to come into contact with the stator 11 adjacent thereto during assembly for positioning between the stator 11 and the brush holder unit 20; and that fixing members (screws 8, 8) are employed, which are inserted from an open side of the motor housing 1, brought into contact with the stator 11, and fixed to the motor housing 1; wherein the motor assembly 10 is positioned within the accommodating portion 5 such that the brush holder unit 20 is in contact with the bosses 6, 6 and that the stator 11 and the brush holder unit 20 are brought into contact with each other through the cylinder portions 26, 26, and wherein by fixing the motor assembly 10 using the screws 8, 8, the motor assembly 10 is interposed and fixed between the screws 8, 8 and the bosses 6, 6.

With this configuration, the motor assembly 10 comprising the commutator motor and the brush holder unit 20 can be attached to the motor housing 1 with better workability. Further, since the motor assembly 10 is interposed and fixed between the screws 8, 8 and the bosses 6, 6, it is not necessary to increase the diameter of the stator 11 for the purpose of ensuring screw-threaded portions and it is not subject to limitations on the construction of the brush holder unit 20. Furthermore, since it is not necessary to protrusively provide the bearing for the rotor on the motor housing 1, an enhanced bearing rigidity can be obtained, which results in less vibration on the rotor as well as in a sufficient operating life of the brushes.

In this exemplary embodiment, the fixing members are screws 8, 8, each of which is inserted from the open side of the motor housing 1 and screwed into the motor housing 1 through the stator 11 and the brush holder unit 20, so that the motor assembly 10 can be interposed and fixed between the screws 8, 8 and the bosses 6, 6 without suffering from backlash in the radial direction or the peripheral direction of the motor housing 1.

In this exemplary embodiment, since the bosses 6, 6 and the cylinder portions 26, 26 are in phase with each other and the screws 8, 8 are inserted through the stator 11 and the brush holder unit 20 at positions of the cylinder portions 26, 26 and screwed into the bosses 6, 6, the interposed position of the motor assembly 10 by the screws 8, 8 and the abutment positions between the component parts are in conformity with each other, so that a more stable assembly can be provided.

In the above exemplary embodiment, the motor assembly 10 is inserted into and attached to the motor housing 1 after assembling the brush holder unit 20 and the stator 11. However, as an alternative, the brush holder unit 20 may be first attached to the motor housing 1, and then the stator 11 is inserted into and attached to the motor housing 1 and finally fixed by screws.

Further, the abutment portion is not limited to the cylinder portion, and various changes or modifications may be made. For example, a multi-sided tubular member or a pair of ribs between which a screw is inserted may be employed as the abutment portion. Such changes or modifications may also be made to the receiving portion. Of course, the number of the abutment portions and the receiving portions can be changed. Further, the abutment portion may be provided on an end surface of the stator 11, instead of providing on the brush holder unit 20. A pair of or pairs of corresponding abutment portions may be provided on opposed surfaces of the brush holder unit 20 and the stator 11.

Further, it is not necessary that the abutment portion is in phase with the receiving portion. The abutment portion and the through hole for screw may be provided with different phases.

In the above exemplary embodiment, each screw 8 is inserted through the stator 11 and the brush holder unit 20 and screwed into the corresponding boss 6. However, it is not necessary that the screws 8, 8 penetrate through the motor assembly 10. For example, screw-threaded portions may be formed on the motor housing 1 near an opening of the motor housing 1 and outside the stator 11, and a screw may be screwed into the corresponding screw-threaded portion through a washer so as to press the end surface of the stator 11 by the washer. Therefore, the stator is interposed between the screw-threaded portions and fixed by screws. In this instance, the screws and the washers function as the fixing members.

Figure 8:
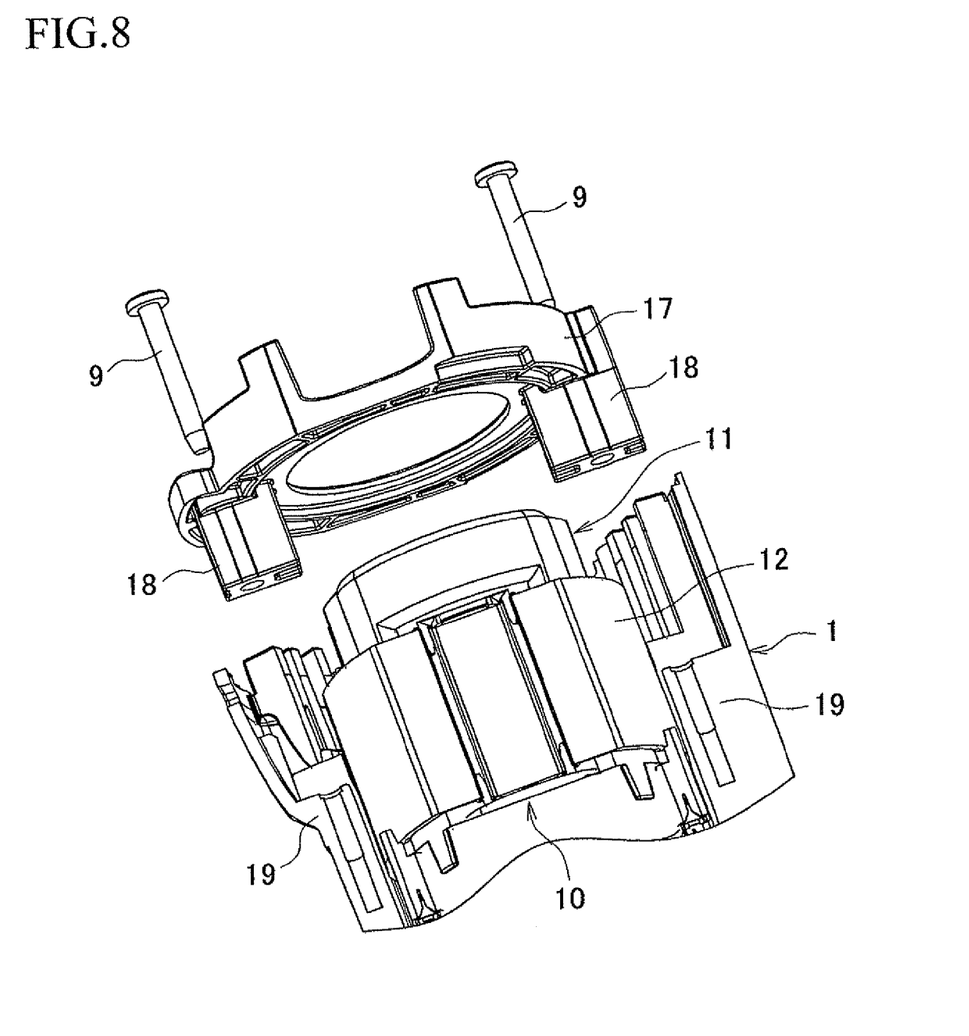
FIG. 8 is a partial perspective view according to a modification.

Another modification may be provided, in which the motor assembly 10 is interposed and fixed between the fixing member and the receiving portion without employing screws penetrating through the motor assembly 10. In this example, a baffle plate for covering an upstream side of a cooling fan that is provided on the rotor of the commutator motor is mounted to the motor housing 1 near an opening of the motor housing 1. To be more specific, as best seen in FIG. 8, a pair of block portions 18, 18 as second abutment portions are formed on a baffle plate 17 in a point symmetrical arrangement. The block portions 18, 18 come into contact with the end surface of the stator 11 adjacent thereto during assembly. Meanwhile, screw-threaded portions 19, 19 are formed on the motor housing 1 near an opening of the motor housing 1, against which the block portions 18, 18 are brought into contact during assembly, so that screws 9, 9 are inserted through the corresponding block portions 18, 18 and screwed into the screw-threaded portions 19, 19.

According to this modification, as with the above exemplary embodiment, the brush holder unit 20 and the stator 11 are press fitted into the motor housing 1 until the brush holder unit 20 comes into contact with the bosses 6, 6. Thereafter, the baffle plate 17 is attached to the opening of the motor housing 1 in such a manner that the block portions 18, 18 contact with both the end surface of the stator 11 and the screw-threaded portions 19, 19. Finally, the screws 9, 9 are inserted from the open side of the motor housing 1 and screwed into the screw-threaded portions 19, 19 through the block portions 18, 18. Accordingly, the motor assembly 10 is interposed and fixed between the baffle plate 17 and the bosses 6, 6.

According to this modification, the block portions 18, 18 are formed on the baffle plate 17, which comes into contact with stator 11 adjacent thereto during assembly for positioning between the stator 11 and the baffle plate 17, and the baffle plate 17 functions as the fixing member such that by fixing the baffle plate 17 to the motor housing 1, the motor assembly 10 is interposed and fixed between the baffle plate 17 and the bosses 6, 6. Therefore, it is possible to attach the motor assembly 10 to the motor housing 1 with better workability without increasing the diameter of the stator 11 and without limitations on the construction of the brush holder unit 20. Further, as with the above exemplary embodiment, an enhanced bearing rigidity can be obtained, which results in less vibration on the rotor as well as in a sufficient operating life of the brushes. Especially, according to this modification, it is possible to provide an efficient attachment structure by which the motor assembly 10 can be interposed and fixed between the baffle plate 17 and the bosses 6, 6 at the same time as assembling the baffle plate 17 with the motor housing 1.

Various changes and modifications may also be made in this modification. For example, other than the block portions 18, 18, the second abutment portion may have other shapes such as a cylinder portion and a pair of ribs. The second abutment portion may be provided on the end surface of the stator 11, instead of providing on the baffle plate 17. Of course, a pair of or pairs of corresponding second abutment portions may be provided on opposed surfaces of the baffle plate 17 and the stator 11. Further, as long as the baffle plate 17 is secured against the receiving portion, instead of using screws, the baffle plate 17 may be attached and fixed to the motor housing 1 by other means such as a bayonet coupling.

The attachment structure according to the present invention may be applicable to other power tools other than the electric hammer.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An attachment structure for a motor assembly comprising:
   a tubular housing;
   a motor assembly including a commutator motor and a brush holder unit configured to hold brushes being slidable in contact with a commutator of the commutator motor;
   an accommodating portion with a bottom, formed in the housing and configured to accommodate therein the motor assembly with the brush holder unit facing downward;
   a receiving portion formed in the accommodating portion and configured to position the brush holder unit when it comes into contact with the brush holder unit;
   an abutment portion at least formed on one of a stator of the commutator motor and the brush holder unit, and configured to come into contact with the corresponding brush holder unit or stator adjacent thereto during assembly so that positioning is made between the stator and the brush holder unit; and
   a fixing member configured to be inserted from an open side of the housing, brought into contact with the stator, and fixed to the housing,
   wherein the motor assembly is positioned within the accommodating portion such that the brush holder unit is in contact with the receiving portion and that the stator and the brush holder unit are brought into contact with each other through the abutment portion, and
   wherein by using the fixing member, the motor assembly is interposed and fixed between the fixing member and an inner surface of the receiving portion.

2. An attachment structure for a motor assembly according to claim 1, wherein the fixing member is a screw, which is inserted from the open side of the housing and screwed into the housing through the stator and the brush holder unit.

3. An attachment structure for a motor assembly according to claim 2, wherein the receiving portion and the abutment portion are in phase with each other, and wherein the screw is inserted through the stator and the brush holder unit at a position of the abutment portion and screwed into the receiving portion.

4. An attachment structure for a motor assembly according to claim 2, wherein the stator comprises a core extending along its axis, a pair of terminal plates positioned at both ends of the core, a pair of main windings wound around the core, and a pair of sets of metal terminals provided in point symmetrical positions on the terminal plate that is positioned on the brush holder unit side.

5. An attachment structure for a motor assembly according to claim 4, wherein a through hole for inserting the screw is formed between each set of metal terminals, penetrating through the core and the terminal plate.

6. An attachment structure for a motor assembly according to claim 4, wherein the brush holder unit comprises a pair of connecting portions having metal terminals respectively, wherein the metal terminals of the connecting portions are electrically connected to the metal terminals of the terminal plate.

7. An attachment structure for a motor assembly according to claim 6, wherein the abutment portion is provided at each connecting portion between each set of metal terminals.

8. An attachment structure for a motor assembly according to claim 1, wherein a pair of receiving portions and a pair of abutment portions are formed in point symmetrical positions with respect to an axis of the housing.

9. An attachment structure for a motor assembly according to claim 1, wherein the abutment portion is a cylinder portion provided on the brush holder unit.

10. An attachment structure for a motor assembly according to claim 1, wherein a rib is formed on the brush holder unit at a position where the receiving portion comes into contact with, in such a manner that a periphery of the receiving portion is surrounded by the rib and the receiving portion is fitted into the rib.

11. An attachment structure for a motor assembly according to claim 10, wherein the rib is U-shaped.

12. An attachment structure for a motor assembly according to claim 1, wherein a baffle plate is mounted to the housing near an opening of the housing, which covers an upstream side of a cooling fan that is provided on a rotor of the commutator motor.

13. An attachment structure for a motor assembly according to claim 12, wherein a second abutment portion is formed at least on one of the stator and the baffle plate, which comes into contact with the corresponding baffle plate or stator during assembly for positioning between the stator and the baffle plate, and wherein the baffle plate functions as the fixing member such that by fixing the baffle plate to the housing, the motor assembly is interposed and fixed between the baffle plate and the receiving portion.

14. An attachment structure for a motor assembly according to claim 13, wherein a screw-threaded portion is formed on the housing near the opening of the housing, against which the second abutment portion is brought into contact, and wherein a screw is inserted through the second abutment portion and screwed into the screw-threaded portion to secure the baffle plate.

15. An attachment structure for a motor assembly according to claim 13, wherein the second abutment portion comprises a pair of block portions.

* * * * *